United States Patent
Choi et al.

(10) Patent No.: US 11,705,036 B2
(45) Date of Patent: Jul. 18, 2023

(54) OPTICAL-TYPE FINGERPRINT RECOGNITION DISPLAY AND OPERATION METHOD THEREOF

(71) Applicants: LG Display Co., Ltd., Seoul (KR); Industry-University Cooperation Foundation Hanyang University, Seoul (KR)

(72) Inventors: Byong Deok Choi, Seoul (KR); Yong Sang Yoo, Seoul (KR); Yong Duck Kim, Seoul (KR); Jeong Min Moon, Paju-si (KR); Soon Shin Jung, Paju-si (KR); Moon Bong Song, Paju-si (KR); Jihwan Jung, Paju-si (KR); Kiseok Chang, Paju-si (KR)

(73) Assignees: LG Display Co., Ltd., Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 17/296,448

(22) PCT Filed: Jun. 3, 2019

(86) PCT No.: PCT/KR2019/006636
§ 371 (c)(1),
(2) Date: May 24, 2021

(87) PCT Pub. No.: WO2020/141662
PCT Pub. Date: Jul. 9, 2020

(65) Prior Publication Data
US 2021/0397814 A1    Dec. 23, 2021

(30) Foreign Application Priority Data
Dec. 31, 2018    (KR) .................. 10-2018-0173479

(51) Int. Cl.
*G06V 40/13* (2022.01)
*G09G 3/20* (2006.01)
(Continued)

(52) U.S. Cl.
CPC ............. *G09G 3/20* (2013.01); *G06F 3/0412* (2013.01); *G06F 3/0421* (2013.01);
(Continued)

(58) Field of Classification Search
CPC ............ G06V 40/1365; G06V 40/1318; G06F 3/0412; G06F 3/04166; G06F 3/0421;
(Continued)

(56) References Cited

U.S. PATENT DOCUMENTS

2011/0199336 A1* 8/2011 Kao ..................... G06F 3/0421
                                                       345/175
2017/0323141 A1* 11/2017 Lee ......................... G06V 40/13
(Continued)

FOREIGN PATENT DOCUMENTS

KR    10-2017-0105272 A    9/2017
KR    10-2018-0061474 A    6/2018
(Continued)

OTHER PUBLICATIONS

PCT International Search Report, PCT/KR2019/006636, dated Sep. 30, 2019, 4 Pages.

*Primary Examiner* — Premal R Patel
(74) *Attorney, Agent, or Firm* — Fenwick & West LLP

(57) ABSTRACT

The present disclosure related to an optical fingerprint identification display and a driving method thereof. In the optical fingerprint identification display and the driving method thereof, the fingerprint identification display includes: a display panel and a processor. The display panel includes a plurality of pixels arranged in a two-dimensional matrix. The pixel includes: at least one subpixel which emits
(Continued)

light on the basis of a first signal received from the processor; and an optical sensor which receives the light emitted from the subpixel and is reflected from a fingerprint and generates a second signal. The processor determines a touch region on the display panel, and transmits the first signal to one or more pixels included in the touch region, and identifies the fingerprint of the user on the basis of the second signal received from the pixel.

10 Claims, 8 Drawing Sheets

(51) Int. Cl.
  *G06F 3/041* (2006.01)
  *G06V 40/12* (2022.01)
  *G06F 3/042* (2006.01)
(52) U.S. Cl.
  CPC ...... *G06F 3/04166* (2019.05); *G06V 40/1318* (2022.01); *G06V 40/1365* (2022.01)

(58) Field of Classification Search
  CPC ........ G06F 3/041; G06F 3/042; G06F 3/0416; G09G 3/20; G09G 2354/00; G06K 9/00
  See application file for complete search history.

(56) References Cited

U.S. PATENT DOCUMENTS

| | | |
|---|---|---|
| 2018/0150671 A1 | 5/2018 | Choo et al. |
| 2018/0300526 A1* | 10/2018 | Cho ..................... G06V 10/141 |
| 2019/0102016 A1 | 4/2019 | Kim et al. |
| 2019/0102594 A1* | 4/2019 | Peng .................. G06V 40/1365 |
| 2019/0228204 A1 | 7/2019 | Park et al. |
| 2020/0210004 A1* | 7/2020 | Seo ...................... G06V 10/955 |

FOREIGN PATENT DOCUMENTS

| | | |
|---|---|---|
| KR | 10-2018-0117748 A | 10/2018 |
| KR | 10-1923320 B1 | 11/2018 |
| KR | 10-2018-0135584 A | 12/2018 |

\* cited by examiner

OPTICAL-TYPE FINGERPRINT RECOGNITION DISPLAY AND OPERATION METHOD THEREOF

FIELD

The present disclosure relates to an optical fingerprint identification display and a driving method thereof.

The present application claims the benefit of priority to Korean Application No. 10-2018-0173479 filed Dec. 18, 2018, the entirety of which is incorporated herein by reference.

DESCRIPTION OF THE RELATED ART

An image display device is currently being used in computer-based systems such as a laptop computer, a tablet PC, a smart phone, a personal digital assistant (PDA), an automated teller machine, and a search guidance system. These systems store usually not only personal information related to personal privacy but also a lot of confidential data such as business information or trade secret. Therefore, there is a necessity of enhancing security in order to protect these data.

A fingerprint can be used as a way to enhance security. As a fingerprint of a finger is used in the computer-based systems, active research is being devoted to a display including a finger identification device, which is expected to be widely used in smart phones.

A conventional fingerprint identification display is implemented by an Add-On or On-Cell method. That is, a method of attaching a capacitive sensor on the display or a method of attaching a photo diode array for optical sensing above or below the display.

However, such a conventional Add-On or On-Cell method has a problem of increasing the thickness of the display and increasing the display cost.

In addition, due to the above problems, the conventional Add-On (or On-Cell) method is not suitable for implementing a full-panel fingerprint identification display.

SUMMARY

Technical Problem

The present disclosure is designed to solve the above-mentioned problems and relates to the implementation of an in-cell type optical fingerprint identification display.

Also, according to the present disclosure, in the implementation of the in-cell type optical fingerprint identification display, a light source of a display panel which is used for image display is used for the optical fingerprint detection. Here, a touch position is detected and a touch region operates in a fingerprint detection mode. The region other than the touch region operate in a normal display mode.

Technical Solution

One embodiment is a fingerprint identification display that includes a display panel and a processor. The display panel may include a plurality of pixels arranged in the form of a two-dimensional matrix. The pixel includes at least one subpixel which emits light on the basis of a first signal received from the processor, and an optical sensor which receives the light emitted from the subpixel and is reflected from a fingerprint and generates a second signal. The processor determines a touch region on the display panel on the basis of information on a position touched on the display panel by a user, and transmits the first signal to one or more pixels included in the touch region, and identifies the fingerprint of the user on the basis of the second signal received from the pixel.

The first signal is generated by the processor on the basis of sensing mode image data stored in advance in a memory.

The sensing mode image data is one of a red pattern, a blue pattern, a green pattern, or a white pattern.

The fingerprint identification display includes a touch panel which transmits the information on the position touched on the display panel by the user to the processor.

The processor determines whether the user has touched the pixel by comparing the second signal with a reference data. When it is determined that the user has touched the pixel, the processor obtains the information on the position touched by the user on the basis of the position of the pixel on the display panel.

The processor drives the optical sensor in units of pixels at regular intervals.

The processor controls the optical sensor to operate within the touch region during multiple frame times, generates a digital signal by performing an analog-digital conversion of the second signal received from the optical sensor, and identifies the fingerprint on the basis of the digital signal and fingerprint data received from the memory.

Another embodiment is a driving method of the fingerprint identification display. The method includes: obtaining a fingerprint identification request signal; determining a touch region on a display panel on the basis of information on a position touched by a user; controlling an optical sensor included in pixels included in the touch region to operate, during a portion of one frame time, and controlling subpixels included in a second pixel included in a region other than the touch region to operate; generating a digital signal by receiving a second signal that the optical sensor has generated on the basis of light reflected from a fingerprint and by performing an analog-digital conversion; and identifying the fingerprint on the basis of the digital signal and fingerprint data received from a memory.

The driving method of a fingerprint identification display further includes: transmitting a first signal based on image data stored in the memory to the second subpixel; and controlling the subpixel included in the second pixel to operate on the basis of the first signal.

The information on the touched position is information which has been received from a touch panel and is about a position touched on the display panel by the user.

The driving method of a fingerprint identification display further includes: determines whether the user has touched the pixel by comparing the signal received from the optical sensor with a reference data; and obtaining, when it is determined that the user has touched the pixel, the information on the position touched on the display panel by the user on the basis of the position of the pixel on the display panel.

Advantageous Effects

According to the present disclosure, the optical fingerprint identification display is implemented in an in-cell type instead of attaching a separate fingerprint sensor, and fingerprints can be detected at any position on the display.

Also, the present disclosure provides an in-cell type optical fingerprint identification display, the thickness and cost of which can be reduced.

Also, according to the present disclosure, a light source of the display panel which is used for image display is used for optical fingerprint detection, and the touch position is detected and then the light source of the display panel is operated in a fingerprint detection mode in the touch region, and the light source of the display panel is operated in the region other than the touch region in a normal display mode, so that it is possible to display images normally on the display even during fingerprint detection.

Also, according to the present disclosure, since information on whether a user has touched and a position touched by the user can be obtained, without a separate touch panel, from the display panel, the thickness and cost of the display can be reduced.

DETAILED DESCRIPTION

Figure 1:
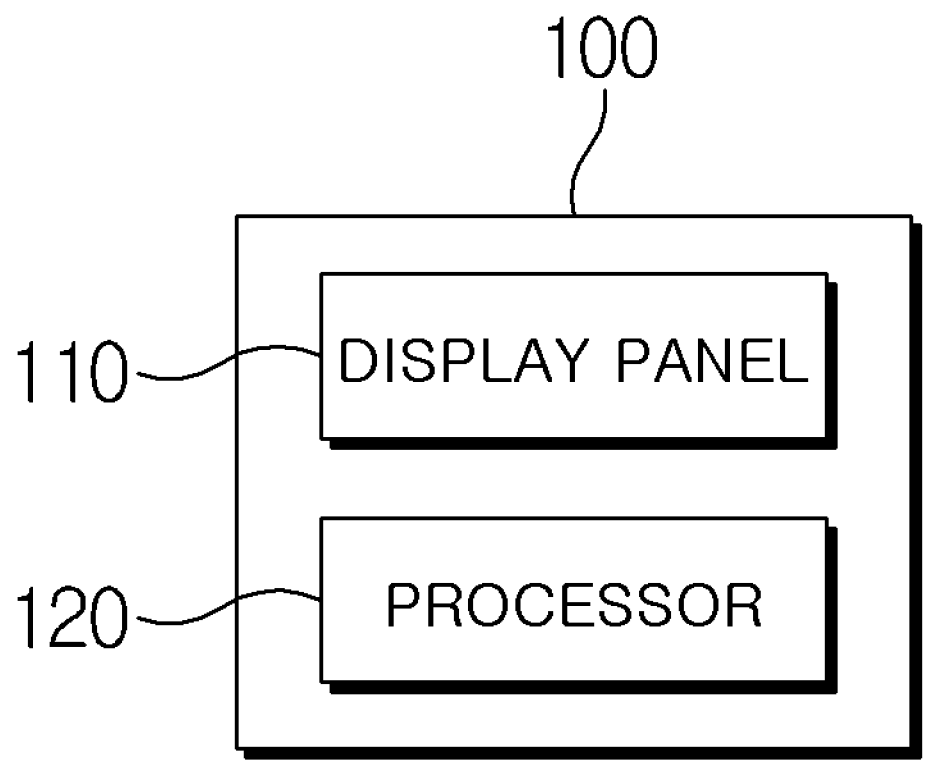
FIG. 1 is a block diagram showing a fingerprint identification display according to an embodiment of the present disclosure.

The features, advantages and method for accomplishment of the disclosed embodiment will be more apparent from referring to the following embodiments described as well as the accompanying drawings. However, the present disclosure is not limited to the embodiment to be disclosed below and can be implemented in different and various forms. The embodiments bring about the complete disclosure of the present invention and are only provided to make those skilled in the art fully understand the scope of the present invention.

According to the embodiment of the present disclosure, a "part" can be implemented as a processor and/or a memory.

The term "processor" is to be construed broadly to include general purpose processors, central processing units (CPUs), microprocessors, digital signal processors (DSPs), controllers, microcontrollers, state machines, and the like. In some circumstances, a "processor" may refer to an application specific integrated circuit (ASIC), programmable logic device (PLD), field programmable gate array (FPGA), and the like. The term "processor" refers to a combination of processing devices, for example, a combination of the DSP and the microprocessor, a combination of a plurality of microprocessors, a combination of one or more microprocessors combined with a DSP core, or a combination of any other such configurations.

The term "memory" should be construed broadly to include any electronic component capable of storing electronic information. The term memory refers to various types of processor-readable media such as random-access memory (RAM), read-only memory (ROM), non-volatile random-access memory (NVRAM), programmable read-only memory (PROM), erase-programmable read-only memory (EPROM), electrically erasable PROM (EEPROM), flash memory, magnetic or optical data storage, registers, and the like. The memory is said to be in electronic communication with the processor if the processor is able to read information from the memory and/or to write information to the memory. The memory integrated in the processor is in electronic communication with the processor.

Hereinafter, embodiments will be described in detail with reference to the accompanying drawings such that that those of ordinary skill in the art can easily implement the embodiments. Also, in the drawings, parts irrelevant to the description may be omitted in order to clearly describe the present disclosure.

FIG. 1 is a block diagram showing a fingerprint identification display according to the embodiment of the present disclosure.

The fingerprint identification display 100 may include a display panel 110 and a processor 120. The display panel 110 may include a plurality of pixels. The pixels may include at least one subpixel and an optical sensor. The pixel may include three subpixels of red, green, and blue and may create various colors required for image display. The display panel 110 may receive a first signal from the processor 120. The first signal may be a signal for the control of the display panel 110 by the processor 120. For example, the display panel 110 may display an image on the basis of the first signal.

The optical sensor included in the display panel 110 may convert received light into an electrical signal. The received light may vary depending on whether a user touches the display panel 110. Also, the received light may vary according to the pattern of a fingerprint of the user. The electrical signal generated based on the received light may be transmitted to the processor 120.

The processor 120 may identify the fingerprint of the user on the basis of the signal received from the display panel 110. Also, the processor 120 may obtain information on a position touched on the display panel 110 by the user on the basis of the signal received from the display panel 110. Also, the processor 120 may transmit an electrical signal based on image data stored in a memory to the display panel 110.

Figure 2:
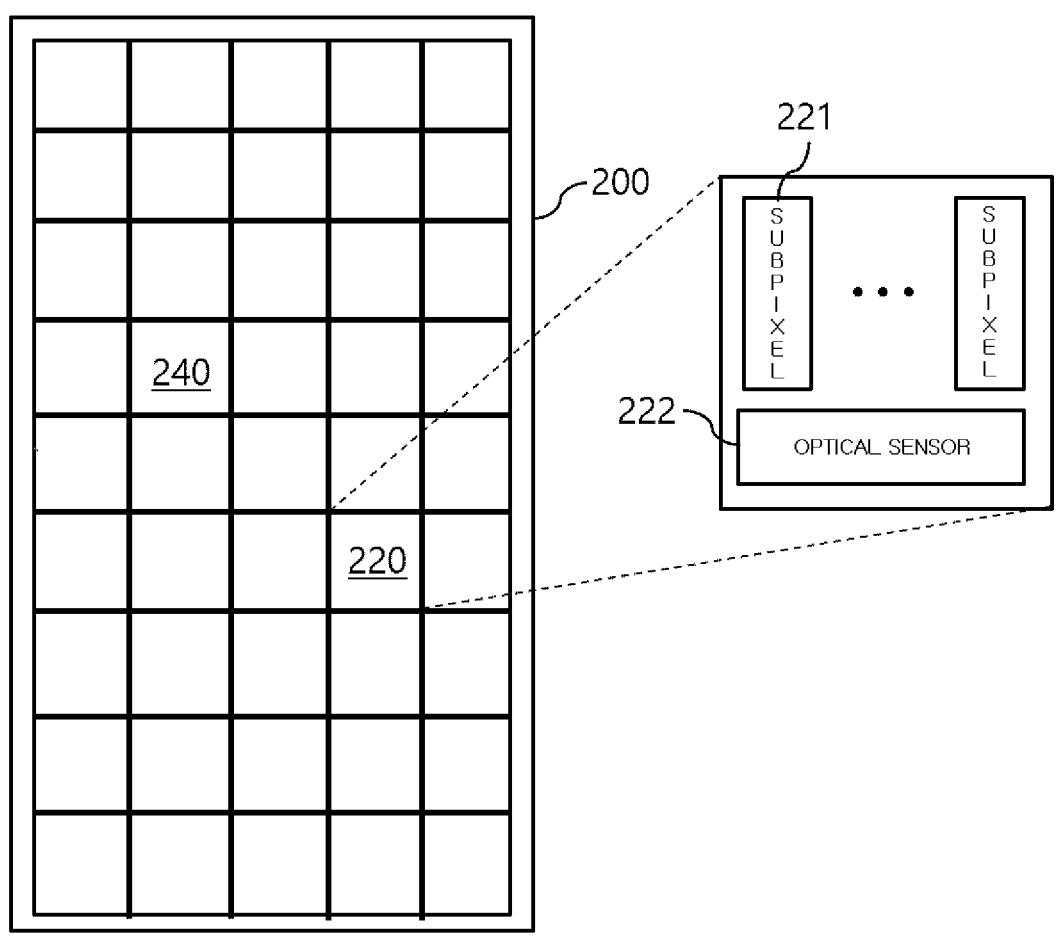
FIG. 2 shows a display panel according to the embodiment of the present disclosure.

FIG. 2 shows the display panel according to the embodiment of the present disclosure.

A display panel 200 may include one or more pixels 220 and 240. The pixel 220 may include at least one subpixel 221 and at least one optical sensor 222.

The subpixel 221 may emit light based on the first signal received from the processor 120. Each of the subpixels included in one pixel may represent one color. The at least one optical sensor 222 may receive light and generate a second signal. For example, the optical sensor 222 may receive light reflected from the fingerprint and generate the second signal. The processor 120 may determine whether the user has touched the display panel 200 on the basis of the signal received from the optical sensor 222. Also, the processor 120 may obtain information on a position touched on the display panel 200 by the user on the basis of the signal received from the optical sensor. Also, the processor 120 may identify the fingerprint of the user on the basis of the signal received from the optical sensor 222. Since the fingerprint identification is performed based on at least one optical sensor 222 included in the pixel 220, the fingerprint identification display 100 according to the embodiment of the present disclosure has the effect of performing the fingerprint identification throughout the display area.

Figure 3:
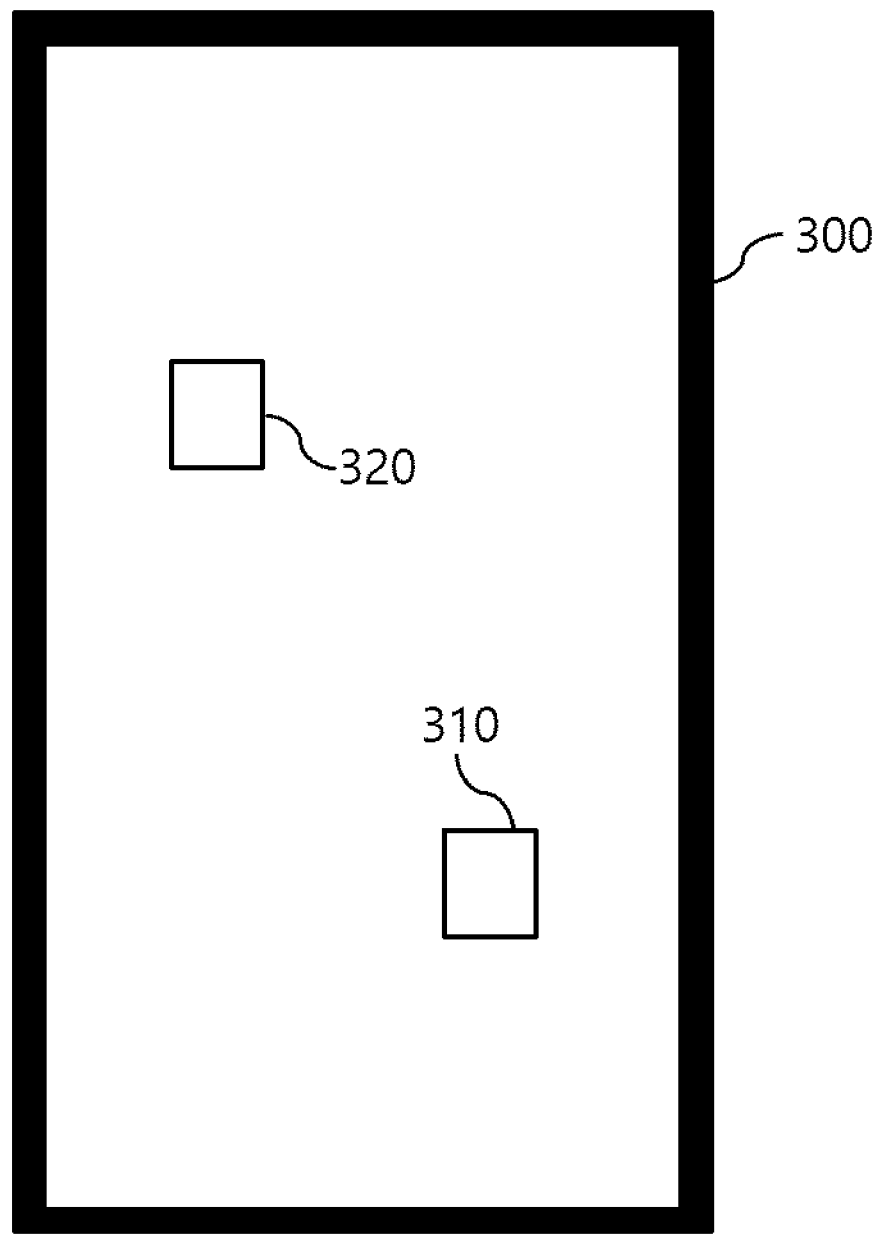
FIG. 3 is a view for describing a process of determining whether a touch has occurred and a process of obtaining information on a touch position in accordance with the embodiment of the present disclosure.

FIG. 3 is a view for describing a process of determining whether the touch has occurred and a process of obtaining information on the position touched by the user.

The user may touch a first region 310. The first region 310 may include a pixel. Regions other than the first region 310 may include a plurality of second pixels. For example, a second region 320 not touched by the user may include the second pixel.

The processor 120 may compare the second signal received from the display panel 300 with a reference data and determine whether the user has touched the pixel. Also, when it is determined that the user has touched the pixel, the processor 120 may obtain the information on the position touched by the user on the basis of the position of the pixel on the display panel 300. The processor 120 may obtain whether the user has touched and the information on a position touched by the user from the display panel 300 without a separate touch panel. Therefore, there is an effect of reducing the thickness and cost of the display.

The reference data may be data received by the processor from the second pixel included in the display panel 300. Since the user has touched the first region 310, the first region 310 may be blocked from light incident from the outside of the fingerprint identification display by the user's body. Accordingly, the light received by the pixel included in the first region 310 may be less than the light received by the second pixel included in the second region 320 where the light is not blocked by the user. Accordingly, the electrical signal generated by the pixel may be different from the electrical signal generated by the second pixel. For example, the magnitude of the current or voltage generated by the optical sensor of the pixel that has received light may be less than the magnitude of the current or voltage generated by the optical sensor of the second pixel that has received light. However, the present invention is not limited thereto, and the magnitude of the current or voltage generated by the optical sensor of the pixel that has received light may be greater than the magnitude of the current or voltage generated by the optical sensor of the second pixel that has received light.

The processor 120 may convert the electrical signal generated by the optical sensor from analog to digital. The processor 120 may determine that the user is touching the first region on the basis of the electrical signal.

The processor 120 may drive the optical sensor in units of pixels at regular intervals. This is because, for example, in detecting the touch position of the user, it is not necessary to drive all the optical sensors included in all the pixels of the display panel 300. Accordingly, there is an effect of reducing power consumption by driving some of the optical sensors in units of pixels at regular intervals.

The size of the first region 310 touched by the user may be smaller than the second region 320 not touched by the user. The processor 120 may receive the electrical signal of the optical sensor from the plurality of pixels. The processor 120 may determine that the electrical signal generated from the pixel included in the first region 310 is different from the electrical signal from the pixel included in the second region 320. Also, when the size of the first region 310 is less than or equal to a predetermined size, the processor 120 may determine that the user has touched the first region 310.

Also, the reference data may be data received from the memory included in the fingerprint identification display. The processor 120 may determine whether the user has touched the display panel 300 on the basis of the data received from the memory and the electrical signal received from the optical sensor. For example, when the electrical signal received from the optical sensor is less than or equal to the data received from the memory, the processor 120 may determine that the user has touched the display panel 300.

Also, when it is determined that the user has touched the first region 310, the processor 120 may obtain the information on the position touched by the user on the basis of the first region 310. The processor 120 may determine the center of the first region 310 as a position touched by the user.

The processor 120 may obtain the information on the position touched by the user on the basis of the electrical signal generated by the optical sensor included in pixels included in the first region 310. For example, the processor 120 may obtain the information on the position touched by the user on the basis of a pixel which generates the smallest electrical signal value or a pixel which generates the largest electrical signal value.

The processor 120 may determine the position or region on the display panel 520 touched by the user on the basis of the obtained information. Also, the processor 120 may control the optical sensor of the pixel included in the region touched by the user to operate. The processor 120 may identify the fingerprint of the user by the operation of the optical sensor. The processor 120 may identify the fingerprint of the user with high sensitivity by allowing all the optical sensors in the region touched by the user to operate.

Also, the processor 120 may control at least one of the optical sensors included in the region not touched by the user not to operate. For example, it is possible to operate a minimum number of the optical sensors required to determine the touch position of the user. The processor 120 may detect the touch of the user at a high speed even with low sensitivity by using at least one optical sensor. The processor 120 may secure processing resources of the processor 120 by limiting the operation of at least one optical sensor, and it is also possible to provide an effect of reducing power consumption by the operation of the optical sensor.

Also, the processor 120 may control at least one subpixel of the pixel included in the region not touched by the user to operate. The processor 120 may operate to display an input image in accordance with image data input from the outside without separate image adjustment in the region not touched by the user.

The processor 120 may operate a pixel included in the region touched by the user to display a specific pattern image. Specifically, the first signal may be transmitted to the pixel included in the touch region on the basis of sensing mode image data stored in advance in the memory. The sensing mode image may be any one of a red pattern, a blue pattern, a green pattern, and a white pattern. In the detection of the fingerprint of the user in the touch region, when a random pattern image is displayed according to the image data input from the outside instead of displaying an image of a fixed pattern, this is because it is an obstacle for the optical sensor to detect the fingerprint by using reflected light of the fingerprint. That is, when a random pattern image instead of an image of a fixed pattern is displayed, since a light source incident on the fingerprint changes every moment, the consequent reflected light changes significantly. Here, this is an obstacle for the optical sensor to detect the fingerprint.

The processor 120 may control at least one subpixel of the pixel included in the region touched by the user not to operate. The processor 120 may control at least one of the pixels included in the region touched by the user to not operate. Even if at least one of the subpixels in the region blocked by the touch of the user does not operate, the user may not feel uncomfortable. The processor 120 may secure processing resources of the processor 120 by controlling at least one of the subpixels not to operate. Also, there is an effect of reducing battery consumption due to the operation of the subpixels.

Figure 4:
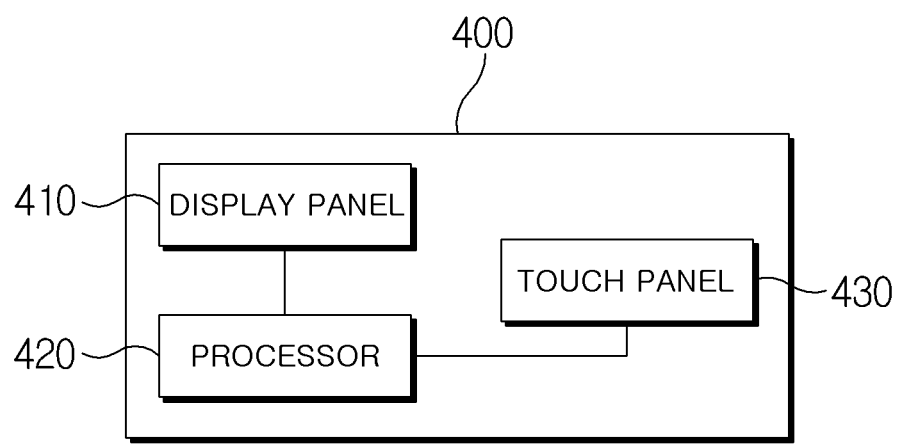
FIG. 4 is a block diagram showing the fingerprint identification display according to the embodiment of the present disclosure.

FIG. 4 is a block diagram showing the fingerprint identification display according to the embodiment of the present disclosure.

The display 400 may include a display panel 410, a processor 420, and a touch panel 430. The display panel 410 of FIG. 4 may correspond identically to the display panel 110 of FIG. 1. The processor 420 of FIG. 4 may correspond identically to the processor 120 of FIG. 1.

The touch panel 430 may transmit the information on the position touched on the display panel by the user to the processor 420. The processor 420 may obtain whether the user has touched the display panel and the information on a position touched by the user on the basis of the information received from the touch panel 430.

Figure 5:
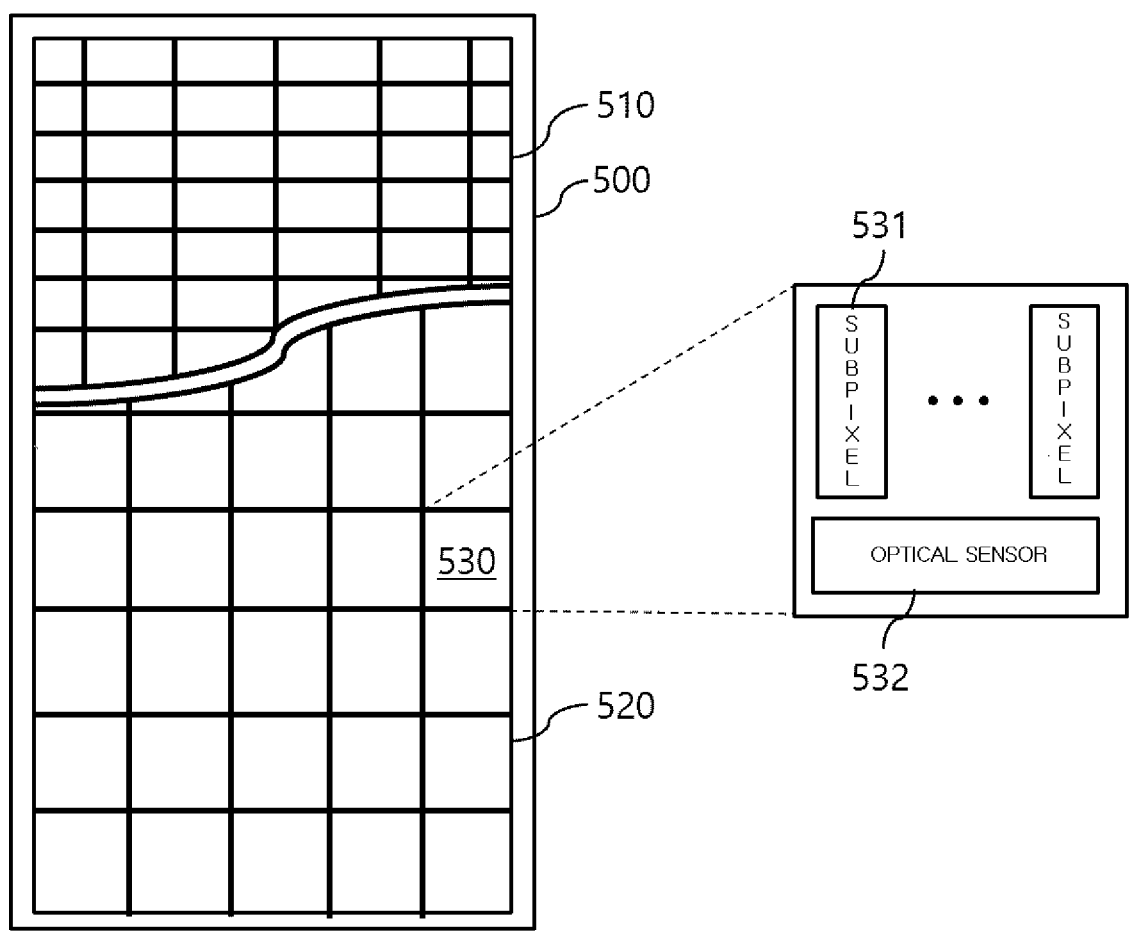
FIG. 5 shows the fingerprint identification display according to the embodiment of the present disclosure.

FIG. 5 shows the fingerprint identification display according to the embodiment of the present disclosure.

The fingerprint identification display 500 may include a touch panel 510 and a display panel 520. The touch panel 510 may be stacked on the display panel 520. The display panel 520 may include at least one pixel 530. The pixel 530 may include at least one subpixel 531 and an optical sensor 532. Since the display panel 520 has already been described with reference to FIG. 2, repetitive descriptions will be omitted.

The touch panel 510 may transmit the information on the position touched by the user to the processor 420. The processor 420 may determine a region touched on the display panel 520 by the user on the basis of the information received from the touch panel 510.

Also, the processor 420 may control the optical sensor 532 of the pixel 530 included in the region touched by the user to operate. The processor 420 may identify the fingerprint of the user by the operation of the optical sensor 532. The processor 420 controls all the optical sensors 532 in the touched region such that all the optical sensors 532 in the region touched by the user operate, thereby providing an effect of improving the fingerprint identification sensitivity of the user.

Also, the processor 420 may control at least one of the optical sensors included in the region not touched by the user not to operate. For example, the processor 420 may control all of the optical sensors included in the region not touched by the user not to operate. The processor 420 may control at least one optical sensor such that at least one optical sensor does not operate, thereby securing processing resources, and there is an effect of reducing battery consumption due to the operation of the optical sensor.

Also, the processor 420 may control at least one subpixel of the pixel included in the region not touched by the user to operate. The processor 420 may control the subpixel such that an image is normally displayed in the region not touched by the user.

The processor 420 may control at least one subpixel 531 of the pixel 530 included in the region touched by the user not to operate. The processor 420 may control at least one of the pixels 530 included in the region touched by the user not to operate. Even if at least one of the subpixels 531 in the region blocked by the touch of the user does not operate, the user may not feel uncomfortable. The processor 420 controls at least one of the subpixels not to operate, thereby focusing resources on more important processing. Also, it is possible to reduce battery consumption due to the operation of the pixel.

Figure 6:
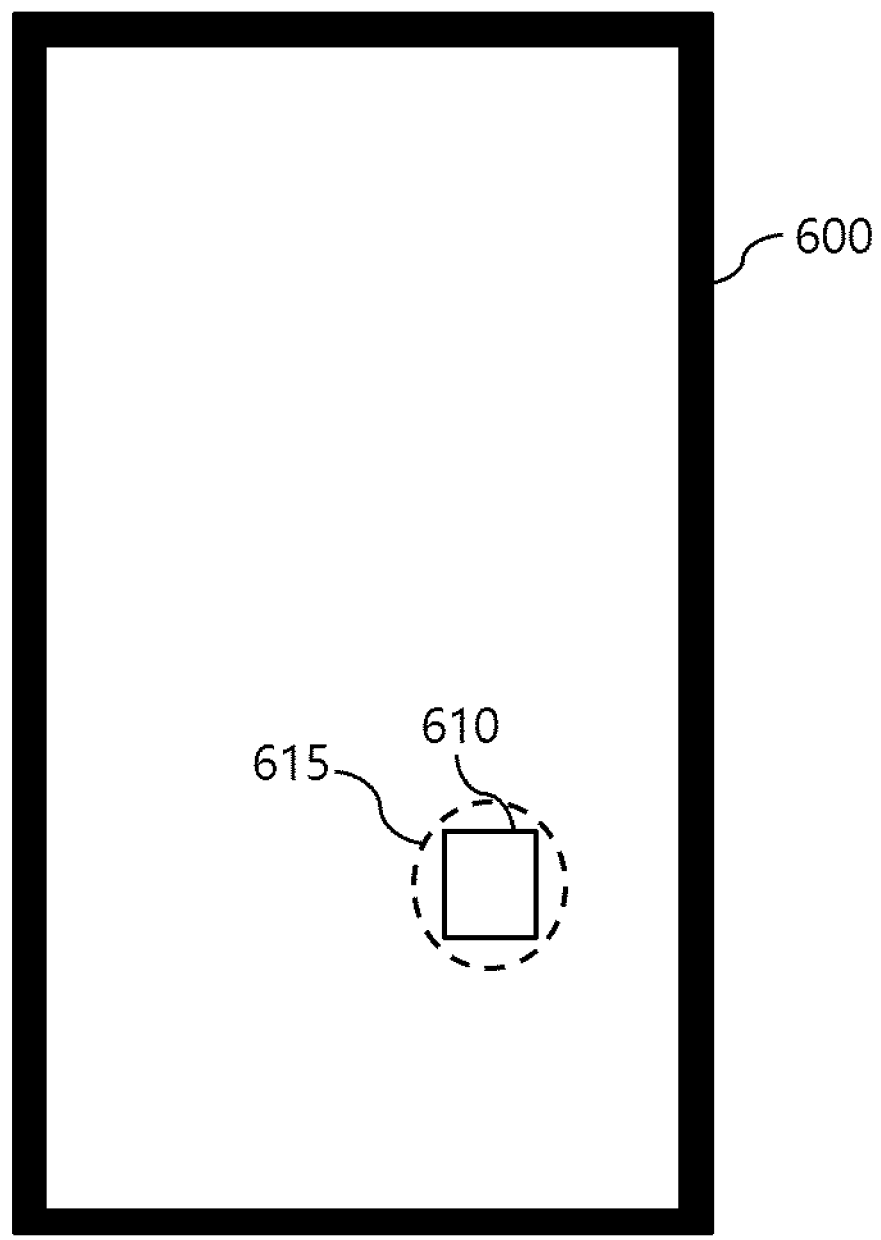
FIG. 6 shows the display panel according to the embodiment of the present disclosure.

FIG. 6 shows the display panel according to the embodiment of the present disclosure.

The processors 120 and 420 may obtain a fingerprint identification request signal. The fingerprint identification request signal may be received from an external device. The external device may include a processor and a memory. Alternatively, the fingerprint identification request signal may be obtained from a switch for fingerprint identification. The fingerprint identification request signal may be obtained from an application being executed by the processors 120 and 420. Also, the processors 120 and 420 may be generated and obtained by a gesture of the user input to the display panel 600.

The processors 120 and 420 may determine the touch region 615 on the display panel 600 on the basis of the information on the touched position 610. The position 610 touched by the user may be a position of one pixel on the display panel 600. The processors 120 and 420 may determine a predetermined region as the touch region 615 from the position 610 touched by the user. However, the present invention is not limited thereto, and the position 610 touched by the user may be the same as the touch region 615. For example, when the processor 120 and 420 obtain the position 610 touched by the user as the position of the plurality of pixels, the position 610 touched by the user may become the touch region 615.

The processors 120 and 420 may control the optical sensor to operate within the touch region. A time period during which the optical sensor operates within the touch region may be multiple frame times. This is because it takes a certain period of time for the optical sensor to receive the light reflected from the fingerprint and to generate a photocurrent, and for the generated photocurrent to generate an output voltage through the fingerprint detection circuit. If the display has a scan rate of 60 Hz, one frame time may be ¹⁄₆₀ second.

Also, the processors 120 and 420 may control the subpixel to operate in the region other than the touch region.

The processors 120 and 420 may perform an analog-digital conversion of the second signal received from the optical sensor and then generate a digital signal. The processors 120 and 420 may identify a fingerprint on the basis of the digital signal and fingerprint data received from the memory. The fingerprint data received from the memory by the processors 120 and 420 may be a fingerprint data previously registered by a specific user. When a similarity between the digital signal and the received fingerprint data is higher than a threshold value, the processors 120 and 420 may determine that the digital signal represents the fingerprint of a specific user.

When it is determined that the digital signal represents the fingerprint of a specific user, the processors 120 and 420 may perform various operations. For example, the processors 120 and 420 may unlock the device including the display. For example, the processors 120 and 420 may authenticate that a legitimate user is in use of a financial application.

Figure 7:
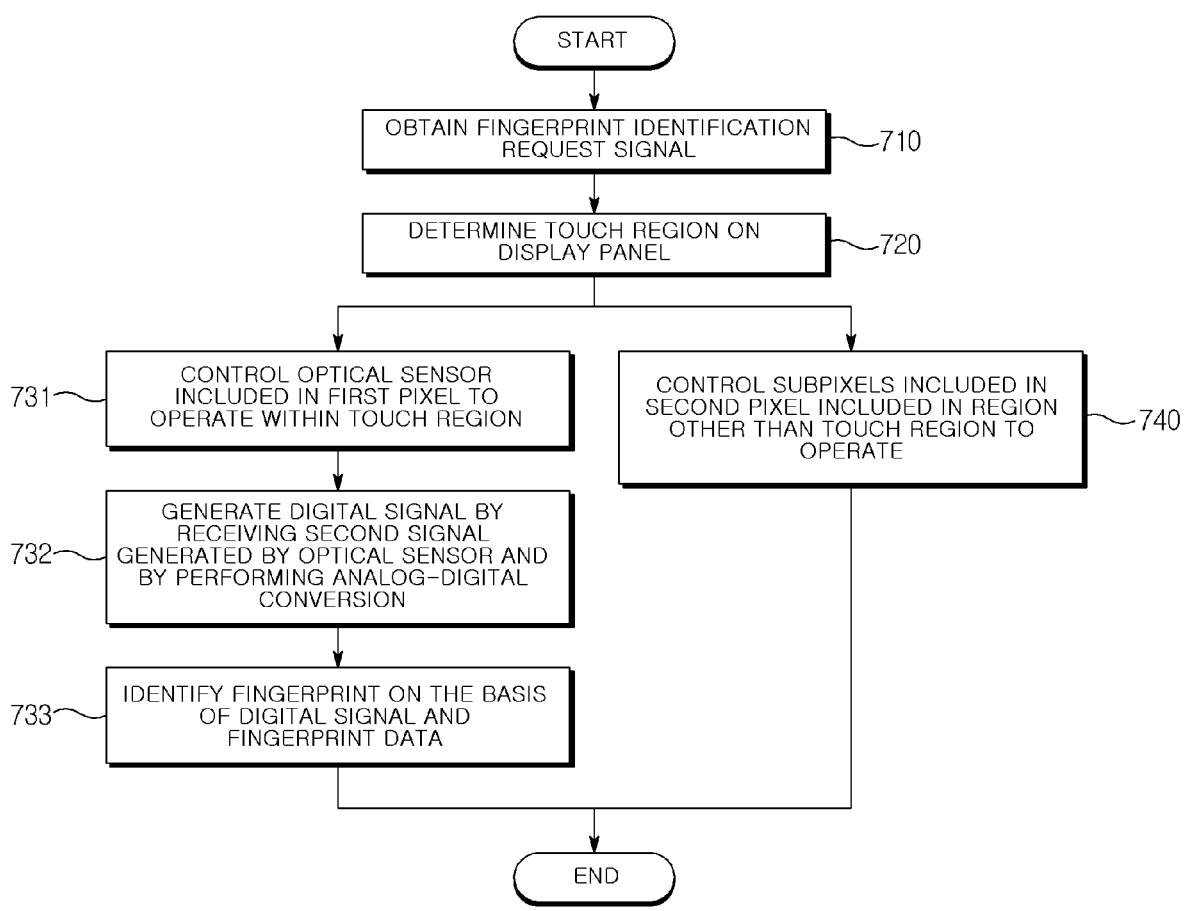
FIG. 7 is a flowchart showing a method for driving the fingerprint identification display according to the embodiment of the present disclosure.

FIG. 7 is a flowchart showing a method for driving the fingerprint identification display according to the embodiment of the present disclosure.

The processors 120 and 420 may perform obtaining a fingerprint identification request signal (710). The fingerprint identification request signal may be received from an external device. The external device may include a processor and a memory. Alternatively, the fingerprint identification request signal may be obtained from a switch for fingerprint identification. The fingerprint identification request signal may be obtained from an application being executed by the processors 120 and 420. Also, the processors 120 and 420 may be generated and obtained by a gesture of the user input to the display panel 600.

The processors 120 and 420 may perform determining the touch region on the display panel on the basis of the information on the touched position (720). The information on the touched position may be, as described above, generated from the display panel 110 or the touch panel 430.

The processors 120 and 420 may determine the touch region on the display panel on the basis of the information on the touched position. The position touched by the user may be the position of one pixel on the display panel. The user may determine a predetermined region as the touch region from the touched position. However, the present invention is not limited thereto, and the position touched by the user may be the same as the touch region. For example, when the processors 120 and 420 obtain the position touched by the user as the position of the plurality of pixels, the position touched by the user may be the touch region.

The processors 120 and 420 may perform controlling the optical sensor included in the pixel included in the touch region to operate during a portion of one frame time (731). Since a high sensitivity optical sensor operation is required for fingerprint identification, the processors 120 and 420 may control all the optical sensors included in the touch region to operate.

The processors 120 and 420 may perform generating a digital signal by receiving the second signal that the optical sensor has generated on the basis of the light reflected from the fingerprint and by performing an analog-digital conversion of the second signal (732). Since the analog-to-digital conversion is for easily processing data by digitizing the data, the analog-to-digital conversion may be selectively added or omitted.

The processors 120 and 420 may perform identifying the fingerprint on the basis of the digital signal and fingerprint data received from the memory (733). The fingerprint data received from the memory by the processors 120 and 420 may be fingerprint data previously registered by a specific user. When a similarity between the digital signal and the received fingerprint data is higher than a threshold value, the processors 120 and 420 may determine that the digital signal represents the fingerprint of a specific user.

When it is determined that the digital signal represents the fingerprint of a specific user, the processors 120 and 420 may perform various operations. For example, the processors 120 and 420 may unlock the device including the display. Also, the processors 120 and 420 may authenticate that a legitimate user is in use of a financial application.

The processors 120 and 420 may perform controlling subpixels included in the second pixel included in a region other than the touch region to operate (740). The processors 120 and 420 may transmit the first signal based on image data stored in the memory to the second pixel. The processors 120 and 420 may control the subpixel included in the second pixel to operate on the basis of the first signal. The processors 120 and 420 may provide an image with a maximum resolution to the user by operating all the subpixels of the pixels included in the region other than the touch region.

Figure 8:
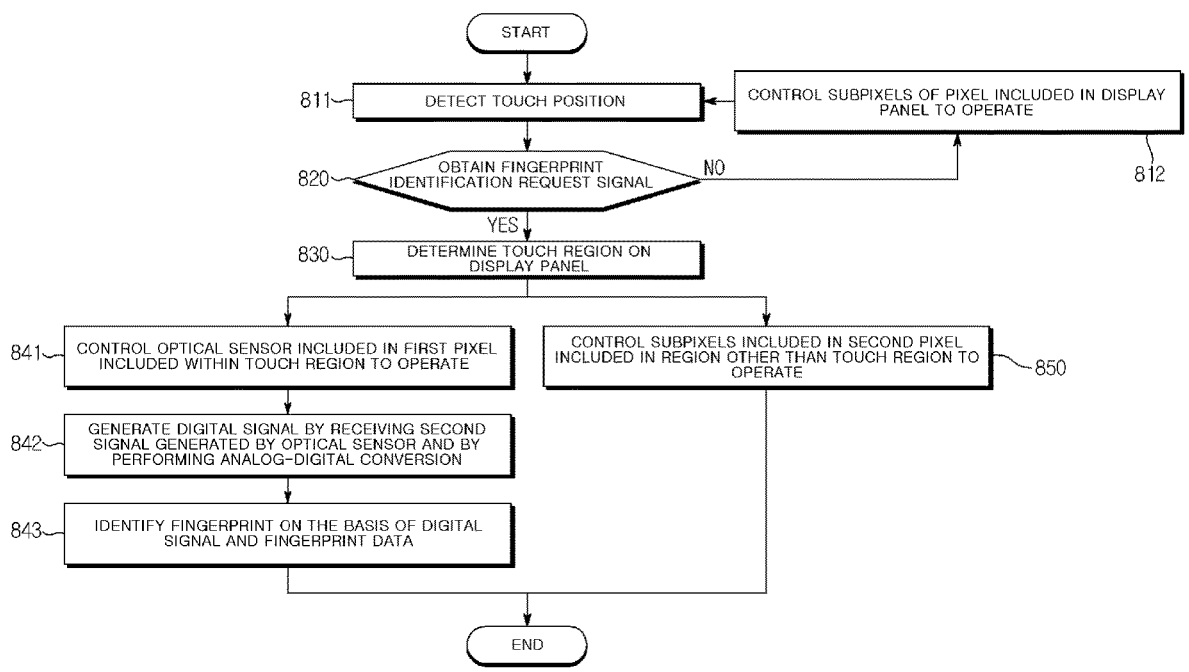
FIG. 8 is a flowchart showing the method for driving the fingerprint identification display according to the embodiment of the present disclosure.

FIG. 8 is a flowchart showing the method for driving the fingerprint identification display according to the embodiment of the present disclosure.

The processor 120 may perform detecting a touch position from the display panel 110 (811). The processor 120 may determine whether the user has touched the pixel by comparing the signal received from the optical sensor with the reference data.

The processor 120 may control at least one of the plurality of optical sensors included in the display panel 110 not to operate. The processor 120 controls at least one optical sensor not to operate, thereby determining, at a high speed even with low sensitivity, whether the user has touched or not. Also, the processor 120 controls at least one optical sensor not to operate, thereby focusing processing power on more important tasks and reducing battery consumption.

When it is determined that the user has touched the pixel, the processor 120 may obtain the information on the position touched by the user on the display panel on the basis of the position of the pixel on the display panel 110.

The processor 120 may determine the position of the pixel as the position touched by the user. However, the present invention is not limited thereto, and the processor 120 may determine a region based on the position of the plurality of pixels as the position touched by the user.

The processor 120 may perform obtaining a fingerprint identification request signal (820). When the fingerprint identification request signal is not obtained, the processor 120 may perform controlling the subpixels of the pixel included in the display panel 110 to operate (812).

When the fingerprint identification request signal is obtained, the processor 120 may perform determining a touch region on the display panel 110 (830). The processor 120 may determine the touch region on the display panel on the basis of the information on the touched position. The position touched by the user may be the position of one pixel on the display panel. The user may determine a predetermined region as the touch region from the touched position. However, the present invention is not limited thereto, and the position touched by the user may be the same as the touch region. For example, when the processor 120 obtains the position touched by the user as the position of the plurality of pixels, the position touched by the user may be the touch region.

The processor 120 may perform controlling the optical sensor included in the pixel included in the touch region to operate during a portion of one frame time (841). Since a high sensitivity optical sensor operation is required for fingerprint identification, the processor 120 may control all the optical sensors included in the touch region to operate.

The processor 120 may perform generating a digital signal by receiving the second signal that the optical sensor has generated on the basis of the light reflected from the fingerprint and by performing an analog-digital conversion of the second signal (842). Since the analog-to-digital conversion is for easily processing data by digitizing the data, the analog-to-digital conversion may be omitted.

The processor 120 may perform identifying the fingerprint on the basis of the digital signal and fingerprint data received from the memory (843). The fingerprint data received from the memory by the processor 120 may be fingerprint data previously registered by a specific user. When a similarity between the digital signal and the received fingerprint data is higher than a threshold value, the processor 120 may determine that the digital signal represents the fingerprint of a specific user.

When it is determined that the digital signal represents the fingerprint of a specific user, the processor 120 may perform various operations. For example, the processor 120 may unlock the device including the display. Also, the processor 120 may authenticate that a legitimate user is in use of a financial application.

The processor 120 may perform controlling subpixels included in the second pixel included in a region other than the touch region to operate (850). The processor 120 may transmit the first signal based on image data stored in the memory to the second pixel. The processor 120 may control the subpixel included in the second pixel to operate on the basis of the first signal. The processor 120 may provide an image with a maximum resolution to the user by operating all the subpixels of the pixels included in the region other than the touch region.

Up to now, various embodiments of the present invention have been described. It can be understood by those skilled in the art that many alternatives, modifications, and variations of the present disclosure can be made without departing from the essential features of the present disclosure. Therefore, the disclosed embodiments are merely exemplary and are not to be construed as limiting the present invention. The scope of the present disclosure is shown in the appended claims and not in the foregoing descriptions. It should be construed that all differences within the scope equivalent to that of the claims are included in the present disclosure.

Meanwhile, the above-described embodiments of the present disclosure can be written as a program that can be executed in a computer, and can be implemented in a general-purpose digital computer that operates the program by using a computer-readable recording medium. The computer-readable recording medium includes a storage medium such as a magnetic storage medium (e.g., ROM, floppy disk, hard disk, etc.), and an optical reading medium (e.g., CD-ROM, DVD, etc.).

What is claimed is:

1. A fingerprint identification display comprising:
    a display panel; and
    a processor,
    wherein the display panel includes a plurality of pixels arranged in a form of a two-dimensional matrix,
    wherein each pixel of the plurality of pixels comprises:
        a plurality of subpixels within the pixel that are configured to emit light based on a first signal received from the processor; and
        an optical sensor within the pixel that is configured to receive the light emitted from the plurality of subpixels and is reflected from a fingerprint and generate a second signal,
    and wherein the processor is configured to drive at least some optical sensors among a plurality of optical sensors within the plurality of pixels to operate responsive to a touch of the display panel not being detected, and drive all optical sensors within at least one pixel included in a touch region that is touched by a user when the touch of the display panel is detected, and identifies the fingerprint of the user based on the second signal received from the pixel.

2. The fingerprint identification display of claim 1, wherein the processor determines the touch region on the display panel based on information on a position touched on the display panel by the user, and transmits the first signal to one or more pixels included in the touch region.

3. The fingerprint identification display of claim 2, wherein first signal is generated by the processor based on sensing mode image data stored in advance in a memory.

4. The fingerprint identification display of claim 3, wherein the sensing mode image data has one of a red pattern, a blue pattern, a green pattern, or a white pattern.

5. The fingerprint identification display of claim 3, wherein the processor controls all of the optical sensors within the at least one pixel arranged in the touch region to operate during multiple frame times, generates a digital signal by performing an analog-digital conversion of the second signal received from the all of the optical sensors within the at least one pixel arranged in the touch region, and identifies the fingerprint based on the digital signal and fingerprint data received from the memory.

6. The fingerprint identification display of claim 2, wherein the fingerprint identification display further comprises a touch panel which transmits the information on the position touched on the display panel by the user to the processor.

7. The fingerprint identification display of claim 2, wherein the processor determines whether the user has touched the pixel by comparing the second signal with a reference data, and wherein, when it is determined that the user has touched the pixel, the processor obtains the information on the position touched by the user based on the position of the pixel on the display panel.

8. A driving method of a fingerprint identification display, the driving method comprising:
    controlling at least some optical sensors among a plurality of optical sensors each included in a plurality of pixels to operate responsive to a touch of a display panel not being detected;
    obtaining a fingerprint identification request signal;
    determining a touch region on the display panel based on information on a position of the display panel touched by a user;
    controlling all optical sensors within one or more first pixels that are included in the touch region to operate, during multiple frame times, and controlling subpixels included in a second pixel included in a non-touch region that is not touched to operate according to an image data received from outside;
    generating a digital signal by receiving a second signal that the all optical sensors within the one or more first pixels included in the touch region has generated based on light reflected from a fingerprint and by performing an analog-digital conversion; and
    identifying the fingerprint based on the digital signal and fingerprint data received from a memory.

9. The driving method of a fingerprint identification display of claim 8, wherein the information which has been received from a touch panel and is about a position touched on the display panel by the user.

10. The driving method of a fingerprint identification display of claim 8, further comprising:
    determines whether the user has touched the display panel by comparing the second signal received from the optical sensors within the one or more first pixels included in the touch region with a reference data; and
    obtaining, when it is determined that the user has touched the one or more first pixels, the information on the position touched on the display panel by the user based on the position of the one or more first pixels on the display panel.

* * * * *